United States Patent [19]
Wilcox et al.

[11] Patent Number: 5,697,454
[45] Date of Patent: Dec. 16, 1997

[54] THREE-POINT HITCH ASSEMBLY

[75] Inventors: Mark Wilcox, Sacramento; Alan Wilcox; Juan M. Trujillo, both of Walnut Grove, all of Calif.

[73] Assignee: Wilcox Brothers Incorporated, Walnut Grove, Calif.

[21] Appl. No.: 503,774

[22] Filed: Jul. 18, 1995

[51] Int. Cl.⁶ .............. F16B 17/00; A01B 59/043
[52] U.S. Cl. ............ 172/447; 172/448; 172/450; 172/439; 280/460.1
[58] Field of Search .............. 280/460.1, 456.1; 172/439, 450, 446, 447, 448

[56] References Cited

U.S. PATENT DOCUMENTS

| | | | |
|---|---|---|---|
| 1,501,652 | 7/1924 | Ferguson | 172/447 X |
| 1,864,639 | 6/1932 | Crezée | 172/446 X |
| 3,056,458 | 10/1962 | Gray | 172/448 |
| 3,090,639 | 5/1963 | Virtue et al. | 280/474 |
| 3,425,715 | 2/1969 | Weitz | 172/272 |
| 3,460,635 | 8/1969 | Danuser | 172/446 X |
| 3,838,740 | 10/1974 | Rogers et al. | 172/439 |
| 3,887,015 | 6/1975 | Kelley | 172/254 |
| 4,203,613 | 5/1980 | Kunze | 280/460 |
| 4,236,724 | 12/1980 | Schillings | 280/460 |
| 4,583,756 | 4/1986 | Hornung et al. | 280/460.1 X |
| 4,640,522 | 2/1987 | Teich | 280/460 |
| 4,645,226 | 2/1987 | Gustavsson et al. | 280/423 |
| 4,650,206 | 3/1987 | Mathis | 280/456 A |
| 4,778,194 | 10/1988 | Koch et al. | 172/448 |
| 4,790,557 | 12/1988 | Klingler | 280/460 A |
| 4,852,657 | 8/1989 | Hardy et al. | 172/2 |
| 4,862,971 | 9/1989 | Azzarello et al. | 172/450 |
| 4,865,134 | 9/1989 | Rugen et al. | 172/450 |
| 4,940,096 | 7/1990 | Johnson | 172/450 X |
| 5,246,077 | 9/1993 | Tjaden et al. | 172/450 |
| 5,361,850 | 11/1994 | Muller et al. | 172/450 |

FOREIGN PATENT DOCUMENTS

| | | | |
|---|---|---|---|
| 212283 | 1/1958 | Australia | 172/446 |
| 247922 | 11/1963 | Australia | 172/450 |

Primary Examiner—Terry Lee Melius
Assistant Examiner—Christopher J. Novosad
Attorney, Agent, or Firm—Bernhard Kreten

[57] ABSTRACT

A hitch assembly is disclosed for use with endless track land vehicles that allows an implement mounted by a three-point hitch arrangement up to about 15 degrees arcing movement off the longitudinal axis oriented in the direction of travel of the land vehicle. A pivotal mounting means is connected to two horizontal arms which are joined at the rear by another member. The mounting means and connecting arms form a four-sided polygonal structure which can be raised or lowered by a hydraulic ram since the arms are pivotally connected at the corners. Finally, a telescoping linkage assembly, after the hitch assembly has been raised through 75 percent of its travel, urges the implement mounting means on the rear vertical connecting arm into a common, pre-selected travel position.

24 Claims, 9 Drawing Sheets

THREE-POINT HITCH ASSEMBLY

FIELD OF THE INVENTION

This invention relates to a three-point hitch, adapted to be used with endless track land vehicles, which will allow any implement to arc off the longitudinal axis oriented in the direction of travel up to about 15 degrees on either side. Additionally, the three-point hitch allows for differing categories of implements to be mounted in a horizontal orientation after adjustment of the hitch assembly. Finally, the hitch assembly has a telescoping linkage positioning assembly which returns the implement mounting means to a common, pre-selected position at the top-most point of hitch travel, and further prevents sway during travel time when the implement is not engaged in the ground.

BACKGROUND OF THE INVENTION

Previous efforts to provide a three-point hitch, especially for endless track land vehicles, addressed two problems in varying ways. The first problem was to provide for a locked position in the travel mode for when the implement was not engaged in the ground. The second problem was how to provide for implement sideways movement off the longitudinal axis oriented in the direction of travel. This was especially important for endless track vehicles wherein steering is accomplished by varying applications of power to one tread verses the other tread. At times, particularly to make an especially sharp turn, no power was applied to one track of the land vehicle. The other track receiving power would sometimes have insufficient traction to move the land vehicle forward due to the drag of the implement encased in the ground. When traction was lost, the tread with the power engaged lost traction and spun without moving the land vehicle forward. What was needed was a hitch with sufficient articulation to allow the implement to move in an arc off the longitudinal axis without hitting other hitch parts when the arc travel was greater than 3–4 degrees.

Previous efforts to provide a three-point hitch which would tolerate sideways arcing movement of the implement mounted to the land vehicle through the hitch assembly have used such devices as loose fittings within the components of the hitch assembly that allow very limited sideways arcing movement, often no more than three or four degrees. However, when significant sideways &fit was needed to be tolerated, such as when an implement was working soils of varying composition that retard the movement of the implement more on one side than the other, the allowed degrees of drift proved to be inadequate.

The disclosure of U.S. Pat. No. 5,361,850 addressed the second problem of locking the hitch assembly into an upraised travel position that would eliminate sway movement of the hitch and implement assembly. A side strut was provided for the lower steering arms of a three-point hitch in which the strut had telescoping members which had their travel locked by a mechanism designed to make sure that the strut was not subject to any bending movements resulting from tensile or compressive forces. However, the interaction of the side strut with the lower steering arms limited the toleration of sideways drift severely. Thus a need for a hitch assembly that could tolerate more than a degree or two of sideways drift was still present.

U.S. Pat. No. 3,090,639 issued to Virtue, et al. disclosed a three-point implement hitch with three members pivotally connected to each other. The top member could be adjusted in length and all the members together can be raised or lowered by a pivotally mounted hydraulic ram. Except for loose fitting of the arms, no allowance was provided for horizontal sway.

U.S. Pat. No. 3,838,740 issued to Rogers, et al. showed a mounting for a vibrating ripper blade that had roughly four members pivotally connected and a hydraulic ram to raise and lower it. The mounting was attached to the prime mover through pivots attached to a plate on the prime mover. This implement mounting was not of a standard three-point hitch variety and was concerned with isolating vibration from the ripper blade.

U.S. Pat. No. 4,236,724 issued to Schillings disclosed a pair of sway bars running from the farm tractor to the lower links of a three-point hitch. The pins to pivotally engage the sway bars to the farm tractor were oriented normal to the pins used to pivotally engage the sway bars to the hitch lower links. The function of the sway bars during the lifting of the hitch was not discussed in terms of guiding the hitch to a common upraised position. In fact, because the longitudinal axis of each of the lower links, which are different from the sway bars, is not parallel to the longitudinal axis of the farm tractor oriented in the direction of travel, the movement of the hitch in a sideways arc is severely restricted. When there is any sideways movement, the pivot point for the implement hitch becomes an imaginary point forward of the hitch mounting point to the tractor. As a consequence, the divergence between actual pivot point and the imaginary pivot point where the implement drag forces converge, makes for an unbalanced drag load on the two-sides of the pivot point with consequent decrease in average effective tractive force (draw bar pounds pull) put out by the tractor. A way to keep the drag force balanced on both sides of the pivot point for a three point hitch was still needed.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| INVENTOR | PATENT NO. | ISSUE DATE |
|---|---|---|
| Ferguson | 1,501,652 | July 15, 1924 |
| Crezee | 1,864,639 | June 28, 1932 |
| Gray | 3,056,458 | October 2, 1962 |
| Virtue et al. | 3,090,639 | May 21, 1963 |
| Weitz | 3,425,715 | February 4, 1969 |
| Rogers et al. | 3,838,740 | October 1, 1974 |
| Kelley | 3,887,015 | June 3, 1975 |
| Kunze | 4,203,613 | May 20, 1980 |
| Schillings | 4,236,724 | December 2, 1980 |
| Teich | 4,640,522 | February 3, 1987 |
| Gustavsson et al. | 4,645,226 | February 24, 1987 |
| Mathis | 4,650,206 | March 17, 1987 |
| Klingler | 4,790,557 | December 13, 1988 |
| Hardy et al. | 4,852,657 | August 1, 1989 |
| Azzarello et al. | 4,862,971 | September 5, 1989 |
| Rugen et al. | 4,865,134 | September 12, 1989 |
| Tjaden et al. | 5,246,077 | September 21, 1993 |
| Müller et al. | 5,361,850 | November 8, 1994 |

The other prior art listed above but not specifically described teach other devices for hitch assemblies and further catalog the prior art of which the applicant is aware. These references diverge even more starkly from the references specifically distinguished above.

SUMMARY OF THE INVENTION

The applicant's three point hitch assembly is adapted to allow for up to 15° horizontal sway on either side of the longitudinal axis of travel. The hitch assembly is pivotably mounted through two spherical plain bearings on a shaft attached through collars, which themselves are attached to mounting plates adapted to be bolted onto a land vehicle, preferably a land vehicle equipped with endless treads. The spherical plain bearings are contained in two bearing mounting plates attached to a lifting pivot housing. Other pivotal mounts such as bushings or other types of bearings can also be used, even if the other mounts allow pivoting in one plane only. The lifting motive power is supplied by a hydraulic ram connected to another spherical plain bearing that is attached to a lift actuation plate. The lift actuation plate is disposed between two curved lower arms which together form the lower bar of a four bar linkage. The forward vertical bar is the lifting pivot housing. The rearward vertical bar is the rear tower to which the implement engagement means is attached. The upper horizontal bar is adjustable in length. Because all bars are pivotably connected to the bars at either end in a four sided polygonal arrangement, the adjustment in length of the upper horizontal bar assures that the implement engagement means will remain vertically disposed for implements of varying gauges when those implements are engaged with the ground.

An additional feature of the instant three point hitch is a pair of telescoping linkage assemblies on either side of the rear tower and hydraulic ram. The linkages are pivotably mounted at the forward upper and rearward lower parts of the hitch assembly. The planes of major pivotal rotation are 90° offset from one another but lesser amounts of pivotal motion are possible in other planes. The rods themselves can rotate about their longitudinal axes to give even more flexibility. Due to the ability of the telescoping linkages to collapse inward, the linkages do not affect the horizontal position of the four bar linkage until 75% of the vertical upward travel of the hitch assembly has been accomplished and the telescoping linkages can collapse no further. After 75%, the linkage assemblies forcefully urge the four bar linkage and attached implement engagement means to a common position. This common position, especially for the lowest horizontal bar, is the same after 100% of vertical upward travel of the hitch assembly.

An additional feature of the instant three point hitch assembly is due to the arch of the lower lines of the paired lower arms. The arch is sufficiently high to allow a draw bar swivel plate to not only remain in place when the three point hitch assembly is being used, but to accommodate a draw bar mounted implement when the three point hitch assembly is raised out of the way, but is still mounted on the land vehicle. This special geometry of the three point hitch assembly forestalls the necessity for removing the three point hitch to attach a draw bar mounted implement, saving considerable time and effort if there is reason to switch between implements of different mounting types. Additionally, a draw bar may be locked off to the side at the end of the draw bar swivel plate if it is desired to keep the draw bar in place when the three point hitch assembly has an implement mounted and engaged in the ground.

OBJECTS OF THE INVENTION

One object of the present invention is to provide a three-point hitch assembly which permits an implement to drift off the longitudinal axis of the land vehicle for substantially more than three or four degrees to one side while the implement is engaged in the ground.

Another object of the present invention is to provide for a hitch assembly which returns the implement to the same position when in a fully raised travel configuration.

A further object of the present invention is to provide a hitch assembly that allows a draw-bar hitch to be utilized while the hitch assembly is still mounted on the land vehicle.

Yet another object of the present invention is to provide for a method for controlling implement position in relationship to a land vehicle wherein the implement is allowed to drift off the longitudinal axis by more than a few degrees.

Yet another object of the present invention is to provide for a hitch assembly that allows a level mounting of implements no matter the mounting gauge of the implements.

Another object of the present invention is to provide a three-point hitch assembly wherein means to urge implement engagement means to a common, preselected point do not come into operation until the hitch assembly has been raised through more than 75 percent of its vertical range of motion.

Viewed from a first vantage point, it is an object of the present invention to provide a hitch assembly, comprising: a pivotal mounting means providing for horizontal movement of the hitch assembly; an implement engagement means; a means for providing for vertical movement of the implement engagement means between a raised position and a ground engagement position; the vertical movement means connecting the implement engagement means and the pivotal mounting means; a means for adjusting the angle of the implement engagement means in relation to the vertical axis of the implement; a means for tolerating and controlling horizontal movement of the implement engagement means; and a means for positioning the implement engagement means at the same point in relation to the pivotal mounting means when the hitch assembly is at its maximum height.

Viewed from a second vantage point, it is an object of the present invention to provide a method for controlling implement position in relationship to a land vehicle, comprising: providing a hitch assembly for mounting an implement onto a land vehicle; a pivotal mounting means providing for horizontal movement of the hitch assembly; an implement engagement means; a means for providing for vertical movement of the implement engagement means between a raised position and a ground engagement position; the vertical movement means connecting the implement engagement means and the pivotal mounting means; a means for adjusting the angle of the implement engagement means in relation to the vertical axis of the implement; a means for tolerating and controlling horizontal movement of the implement engagement means; a means for positioning the implement engagement means at some point in relation to the pivotal mounting means when the hitch assembly is at its maximum height; engaging a selected implement; lowering the hitch assembly so that the implement engages the ground; driving the land vehicle across the ground allowing the implement a limited drift on and off the longitudinal axis travel parallel to direction of travel; raising the hitch assembly to disengage the implement from the ground and travel to a pre-selected position in the highest hitch assembly setting, and disengaging the implement when work desired is finished.

Viewed from a third vantage point, it is an object of the present invention to provide a hitch assembly attached to a land vehicle equipped with endless treads, for use in mounting implements behind the land vehicle, the assembly being movable between a raised position and a lowered operating position, the hitch assembly comprising: swivel mounting means for mounting the hitch assembly to the land vehicle providing for horizontal swivel; positioning means for moving the hitch assembly from the raised position to the lowered operating position, the positioning means comprising a four bar linkage formed by connecting arms, and a drive means, the arms connected pivotally to each other at corners of a four-sided polygon formed by at least two horizontal arms and at least two vertical arms, one horizontal side of the polygon which can be adjusted in length and locked at a desired length, two pivoting corners held at fixed positions on the swivel mounting means, two corners held at fixed positions on the implement engagement means; stop means to limit horizontal swivel of the four bar linkage mounted on an inboard surface of the swivel mounting means; the implement engagement means attached to a rearward vertical arm; a telescoping rod positioning assembly pivotally mounted between the swivel mounting means and the implement engagement means to return the hitch assembly to the same point when the hitch assembly is fully raised.

These and other objects will be made manifest when considering the following detailed specification when taken in conjunction with the appended drawing figures.

DESCRIPTION OF PREFERRED EMBODIMENTS

Figure 1:
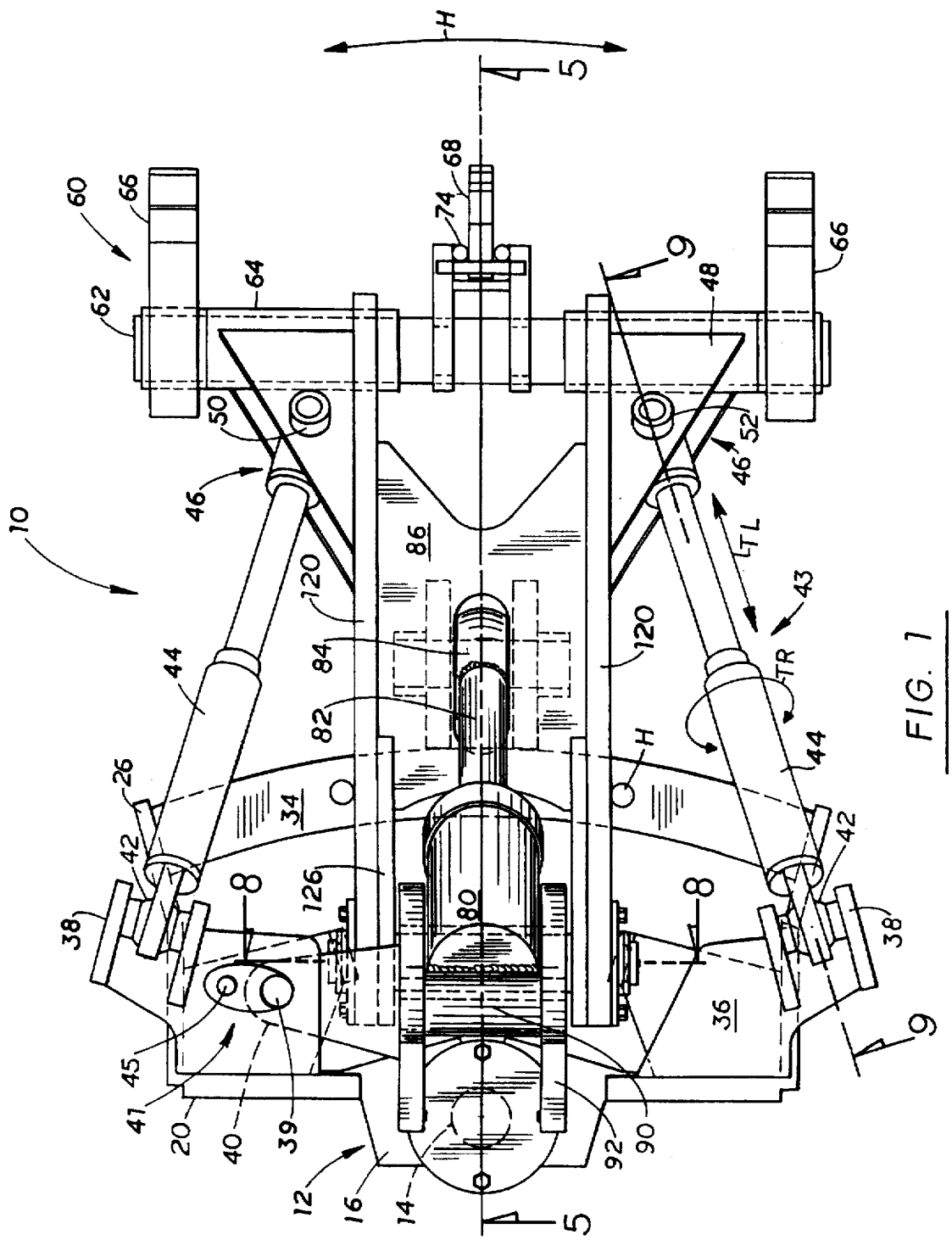
FIG. 1 is a top plan view of the hitch assembly.

Considering the drawings, wherein like reference numerals denote like parts throughout the various drawing figures, reference numeral 10 is directed to the three point hitch assembly according to the present invention. In essence, the three point hitch 10 has a first assembly serving as pivotable mounting means 12. The pivotable mounting means 12 engages through mounting spherical bearings 95, the hitch assembly 10 and allows a lifting pivot housing 92 of the hitch assembly 10 to move either direction horizontally up to approximately 15° as shown by the double headed arrow H (see FIG. 1). The lifting pivot housing 92 also serves as the forward vertical bar of a four bar linkage 91. The rearward vertical tower 114 of the four bar linkage 91 serves as an attachment point for implement engagement means 60. The motive force of a hydraulic ram 80 acting on the lower horizontal bar 120 moves the four bar linkage 91 and attached implement engagement means 60 in either vertical direction as indicated by double headed arrow V (see FIG. 5). Also part of the four bar linkage 91 is a length adjustment means 103 for the upper arm 102. By adjusting the length of upper arm 102 as indicated by doubled headed arrow L, the vertical orientation of rear tower 114 with attached implement engagement means 60 can be pivoted in the directions as indicated by double headed arrow P to maintain a perpendicular (to the ground) orientation of the implement engagement means 60.

Running between pivotal mounting means 12 and implement mounting means 60 are telescoping linkage assemblies 43. When the hitch assembly 10 is moving in a horizontal direction as indicated by arrow H in FIG. 1, the length of telescoping linkages 44 can change in the dimension as indicated by double headed arrow TL. When the hitch assembly 10 moves in a vertical direction as indicated by arrow V in FIG. 5, the telescoping linkages 44 pivot in either of the directions indicated by the double headed arrow TV in FIG. 2, and their length shortens. After 75% of the vertical upward range of travel has been reached, the telescoping linkage assembly 43 exerts a centering force indicated by the two arrows C in FIG. 10 because the linkage can not collapse any further. This centering force moves the three point hitch 10, especially the lower horizontal bar 120, to a common position in relation to the land vehicle for travel when any three point implement is not engaged with the ground.

Now referring to FIG. 1, the pivotable mounting means 12 is seen at the left side of the figure. The mounting means consists of a shaft 14 that is embraced by an upper collar 16 and lower collar 18 (seen in FIG. 4). Attached to both sides of the collars 16 and 18 are mounting plates 20. These mounting plates 20 attached by bolts 24 are fitted to the land vehicle 22. The one shown in FIG. 4 has endless tracks 28 outside of mounting skirt 26 of the hitch assembly 10. The horizontal pivoting motion of the hitch assembly is limited by stop plates 30 mounted at the lower edge of mounting plates 20 on either side of shaft 14. The actual place of contact for the hitch assembly are bump plates 32 mounted on stop plates 30. Rearward of the stop plate 30 is draw bar swivel plate 34. This draw bar swivel plate 34 has no function in the three point hitch 10 operation. However, for commercial success, draw bar swivel plate 34 is needed when an implement is mounted through the use of a draw bar hitch. Any draw bar would run over the top of and move in an arc along draw bar swivel plate 34 and can be fixed in position through the use of a pin through the draw bar into the holes H shown in draw bar swivel plate 34 when it is desired to lock the draw bar at one angle. The draw bar then would continue forward attaching itself to the land vehicle 22 undercarriage in front of the three point hitch assembly 10.

Referring again to FIG. 4, at the top of mounting plates 20 are horizontally disposed top shelves 36 on either side of the upper and lower collars 16 and 18. Disposed on top shelves 36 are top bearing mounts 38. Referring now to FIG. 1, a top shelf 36 is seen disposed on either side of shaft 14 with the associated top bearing mount 38. Disposed above top shelf 36 on the upper side of the figure's median line of hitch assembly 10 is top locking pin positioning handle 41. The handle 41 is composed of a primary pin 39 that extends through top shelf 36 and engages a hole in wing plate 40 that is attached to lifting pivot housing 92. When the primary pin extends through top shelf 36 and into wing plate 40, the hitch 10 is locked into a position that tolerates no horizontal arcing movement and aligns the implement travel axis with the travel axis of land vehicle 22. When toleration of horizontal arcing movement is desired for the hitch assembly 10, the primary pin 39 is lifted up out of engagement with wing plate 40 by handle 41 containing primary pin 39. The handle 41 also contains an integral cap portion 45 adapted to fit over a secondary pin mounted on top shelf 36, by rotating and elevating handle 41 to cover the secondary pin. The height of the secondary pin elevates handle 41 sufficiently to raise primary pin out of engagement with the opening in wing plate 40. Then wing plate 40 can swivel along with lifting pivot housing 92, which means the whole hitch can now travel in an arcing movement.

Continuing to look at FIG. 1, the pivotable bearing 42 is shown mounted within top bearing mount 38. Attached to pivotable bearings 42 are telescoping linkages 44 on either side of the hitch assembly. A telescoping linkage 44 is composed of cylinders within each other that can rotate in relationship with each other, as shown by double headed arrow TR in FIG. 1. Telescoping linkages 44 continue on until they are connected to bottom bearing mounts 46. A bottom bearing mount 46 is contained between two triangular plates 48. Protruding through triangular plates 48 are bearing shafts 50.

Figure 9:
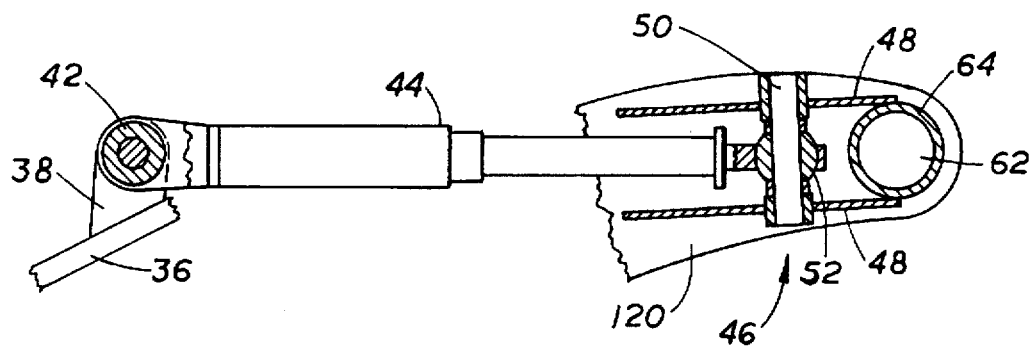
FIG. 9 is a partial cross-sectional view taken along lines 9—9 of FIG. 1.
Figure 10:
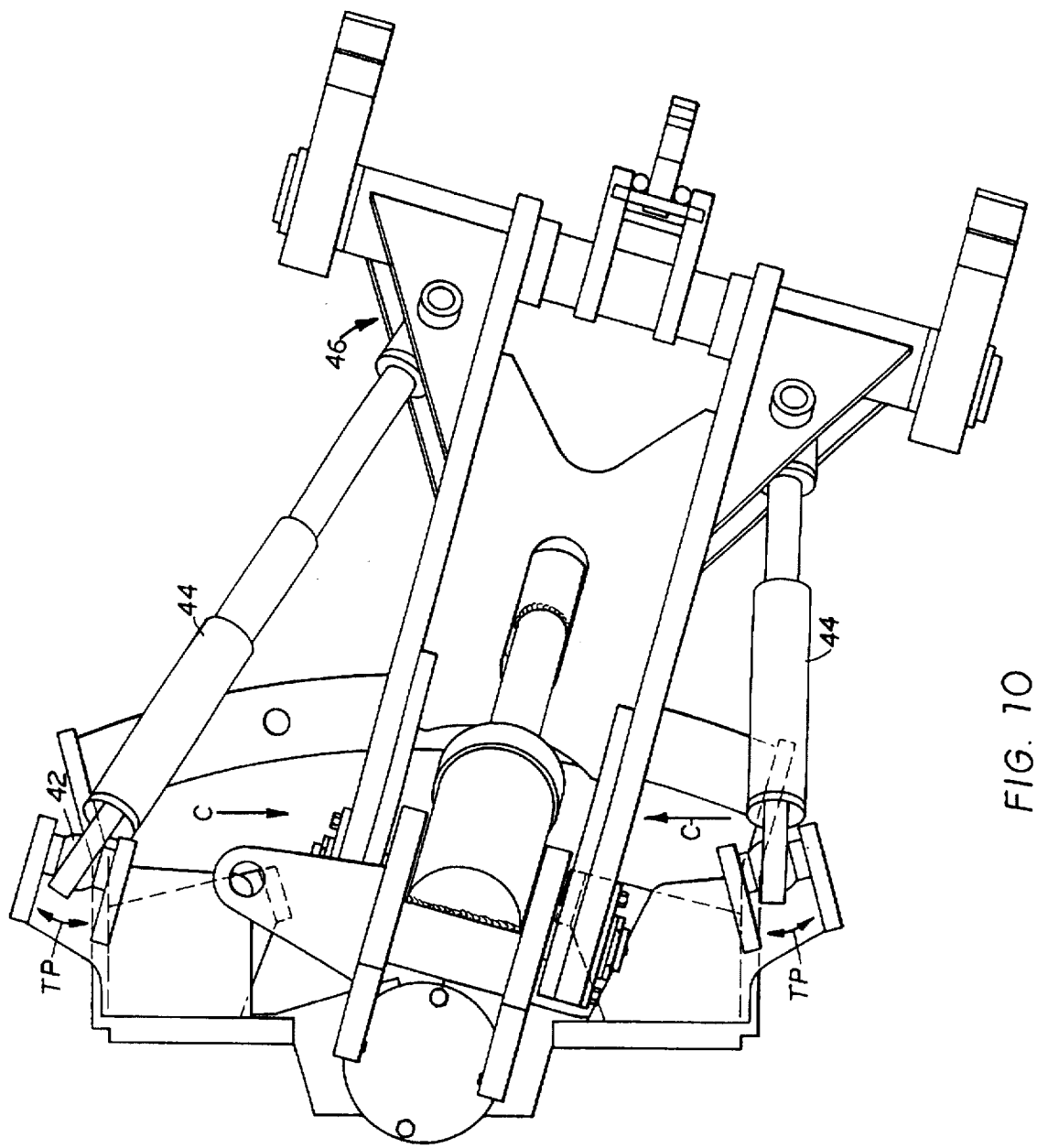
FIG. 10 is a top plan view of the hitch assembly pivoted out of alignment with the longitudinal axis of the direction of travel of the land vehicle.

The function of telescoping linkages 44 is to urge the hitch assembly toward a common position, that is preselected for its desirability in tolerating the stress generated by land vehicle 22 when traveling. For instance, when the land vehicle 22 has reached the end of the row and any implement is finished with its work, in order to turn the vehicle and line it up to work the next row, the implement is taken out of the ground. When taking the implement out of the ground and preparing for travel between the rows, it is preferable that the hitch return to the same position. The telescoping linkages 44 allow the hitch to be raised through 75% of its travel, before coming into effect to move the hitch assembly toward the desired common position. It is also to be noted that the telescoping linkages 44 bearings 42 and 52 allow primary rotation in their mounts 38, 46 in planes that are offset by 90°. Limited pivoting in the horizontal plane as shown in FIG. 10 for the telescoping assembly 44 through pivotable bearings 42 is also possible. Also, a limited amount of pivoting in the vertical plane for telescoping assembly 44 through bearing 52 is shown in FIG. 9. In FIG. 1, looking at telescoping linkage assembly 44 below the figure's center line, the pivotable bearing 42 primarily rotates in a plane normal to the top plan of the hitch assembly 10. However, the bottom bearings 52 (in FIG. 9) inside bottom bearing mount 46, primarily rotates in a plane that is parallel to the top plan of hitch assembly 10. By allowing the bearings on either end of telescoping linkages assembly 44 to rotate in directions normal to one another, the telescoping linkages allow for sideways arcing movement of the hitch assembly, while still urging the hitch assembly to a common position after 75% of the upward travel of the hitch assembly 10 has been accomplished.

Referring again to FIG. 1, implement engagement means 60 is seen at the right side of the figure. A round bar 62 serves as a load bearing part for the two outward lower couplers 66. Surrounding round bar 62 is sleeve 64 to which lower couplers 66 are attached. At the center of the figure at the right side, is top hook 68. Now referring to FIGS. 2 and 3, perspective views of the three point hitch assembly 10, top hook 68 can be seen to be slideably engaged within hook engagement slot 74. Because this slot 74 has more than one fixed position for top hook 68, the three point hitch assembly 10 can accommodate various classes of three point hitch implements. Shown in its top position, top hook 68 engages the upper bar on any implement of Category IV N (N is for narrow for spacing between the two bottom lower couplers 66 and the top link implement pin is 1.75 inches in diameter) for three point hitches. Top hook 68 is kept at the top of hook engagement slot 74 by its wing stops 69 on both sides of the hook resting on the top surface of rear tower 114 in which hook engagement slot 74 is contained. The wing stops 69 prevent top hook 68 from sliding further down into hook engagement slot 74. If a different design of top hook 68 is at the bottom of hook engagement slot 74 it is because it has no wing stops 69 and hence is free to slide to the bottom of slot 74, the implement engagement means 60 would then accommodate a Category III (top link implement pin is 1.25 inches in diameter) three point hitch implement.

Top hook 68 is an open hook design wherein the pins for mounting on the implement rest at the bottom of the opening. Different top hooks 68 can be slid in and out of slot 74 to accommodate different categories of implements. However, looking at lower coupler 66 at the right side of the drawing FIGS. 2 and 3, it can be seen that swinging restraint 70 restricts travel once the pin of the implement is at the bottom of the opening of the hook in lower coupler 66. More specifically, once the pin has reached the bottom of the hook cavity, swinging restraint 70 can be locked into a blocking position by lock pin 78. Locking pin 78 is kept in position by cotter pin 72. The swinging restraint 70 pivots on coupler pivot 76. Once the pin of the implement is locked into position, the swinging restraint 70 blocks it from traveling upwards and out of lower coupler 66. In this way, when land vehicle 22 traverses ground, sudden shocks to the implement that translate into vertical upward forces, will not disengage the implement from the three point hitch assembly 10.

Figure 5:
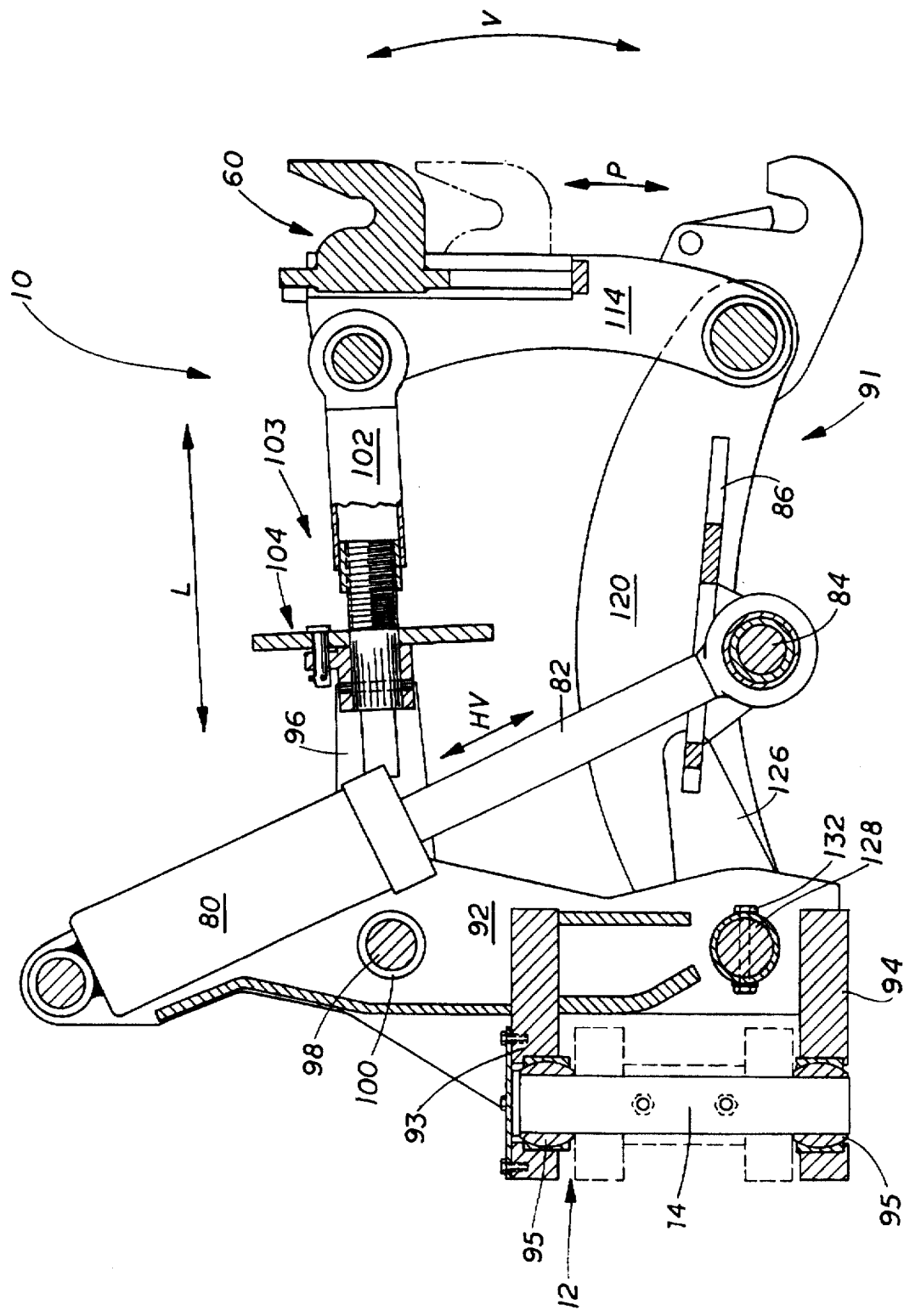
FIG. 5 is a vertical cross-sectional view taken along lines 5—5 of FIG. 1.

Referring now to FIG. 1 and FIG. 5, hydraulic ram 80 provides motive power for lifting and lowering the three point hitch assembly 10. Hydraulic ram 80 retracts and extends ram arm 82 which is attached to ram plane spherical bearing 84. The ram plane spherical bearing 84 is attached to lift actuation plate 86.

Figure 3:
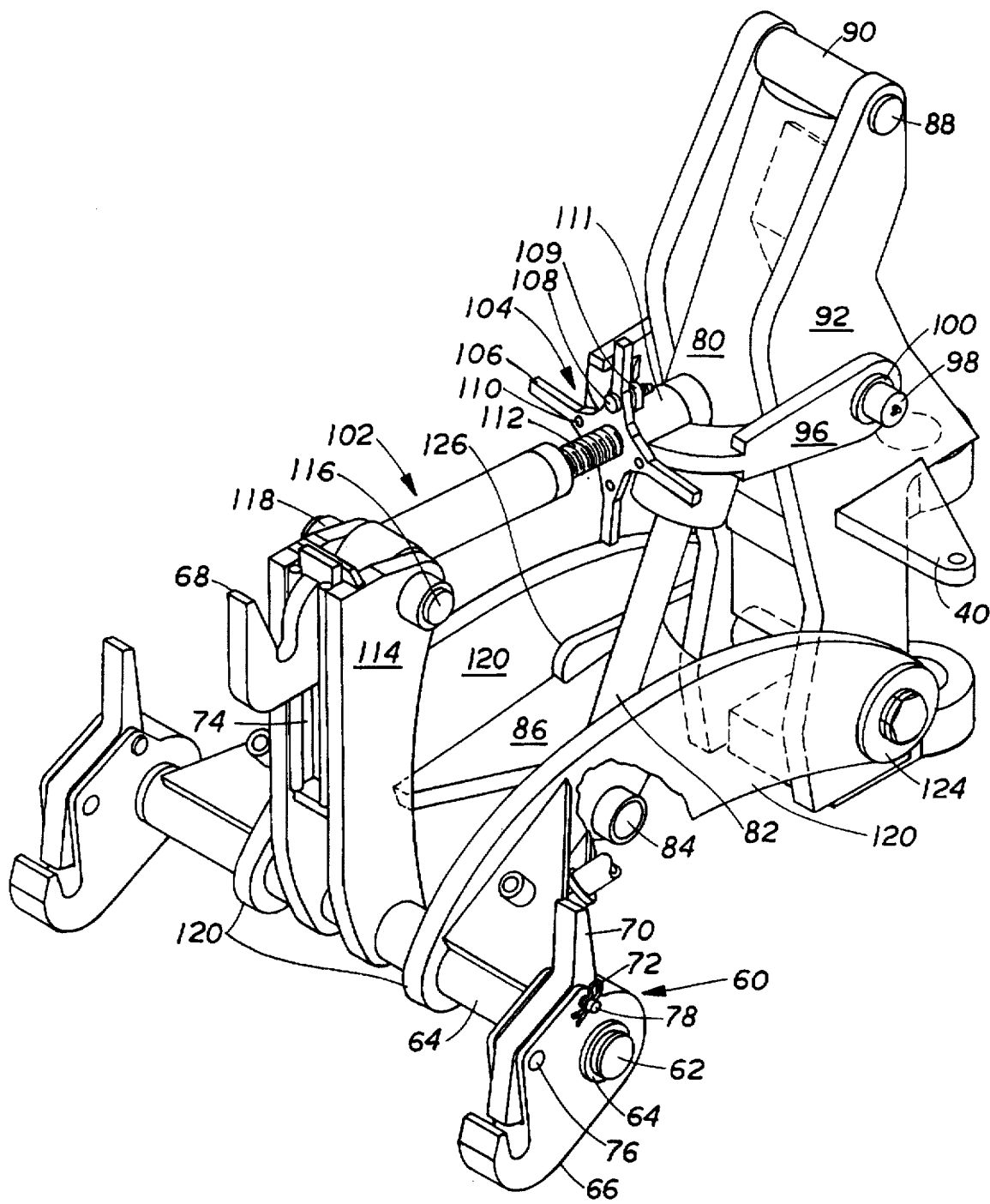
FIG. 3 is a perspective view of the hitch assembly from the same point of view as in FIG. 2, only with some of the hitch assembly structure removed to show greater detail.

Referring now to FIG. 3, at the other end of the hydraulic ram 80 lifting pivot shaft 88 is contained within lifting pivot attachment sleeve 90. The lifting pivot shaft 88 and lifting pivoting attachment sleeve 90 are mounted at the top of the lifting pivot housing 92. Lifting pivot housing 92 has two plates on either side of the lifting pivot attachment sleeve 90. As shown in FIG. 5, running between these two plates 92 are also horizontally disposed upper bearing mounting plate 93 and lower bearing mounting plate 94. The bearing mounting plates 93 and 94 are adapted to attach to mounting spherical bearings 95. These mounting spherical bearings 95 abut the upper collar 16 and lower collar 18. In this way, the horizontal sway of three point hitch assembly 10 is accommodated through the movement of lifting pivot housing 92 as it moves in a horizontal plane as allowed by mounting spherical bearings 95 on shaft 14.

Figure 6:
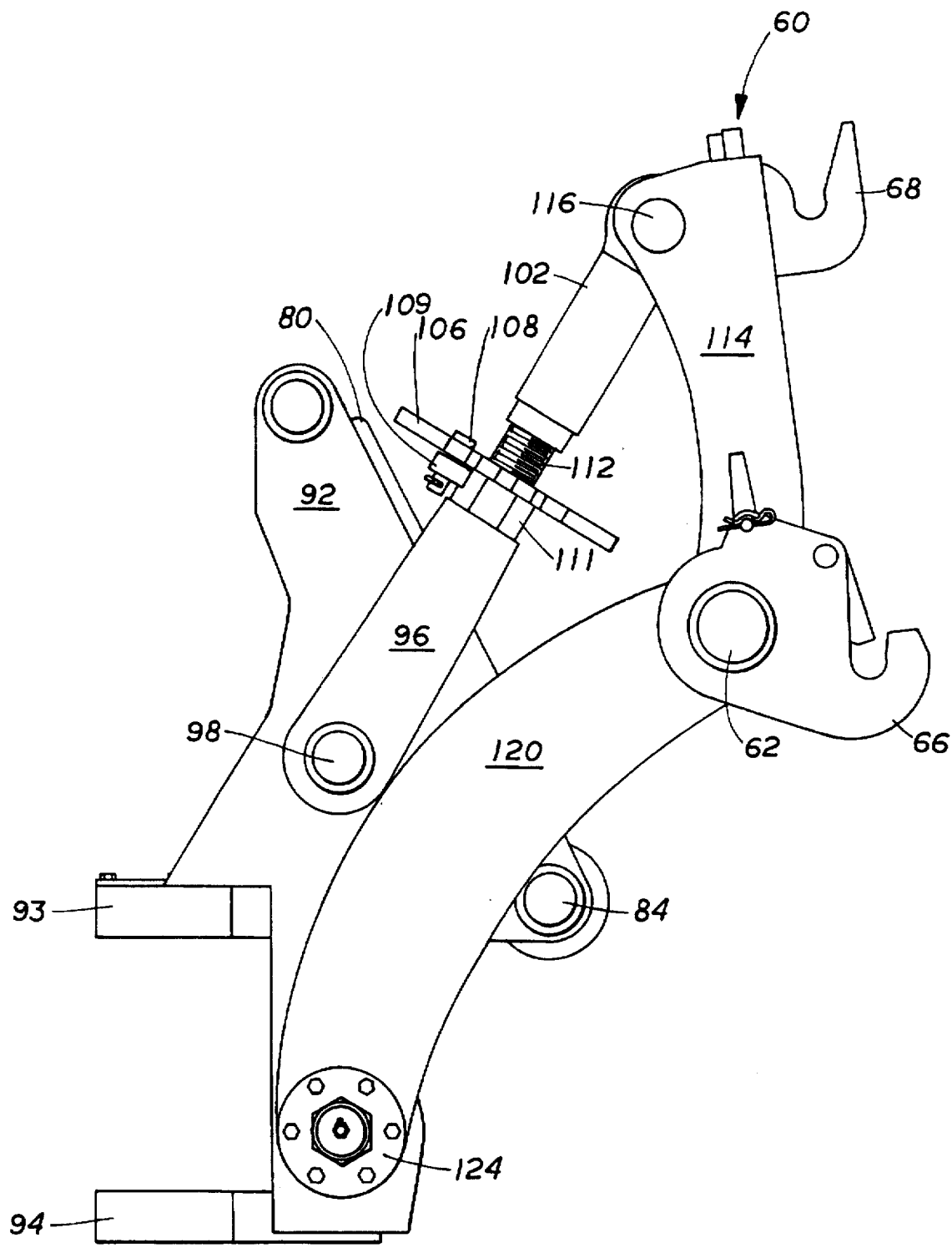
FIG. 6 is a partial view of the apparatus showing the four bars of the linkage and the hydraulic ram.

Lifting pivot housing 92 also provides a point of attachment for upper arm clevis 96 (FIG. 6). Upper arm clevis 96 is part of the upper bar of the four bar linkage of the three point hitch assembly 10. Upper arm clevis 96 is attached to lifting pivot housing 92 through upper arm pivot shaft 98. Upper arm pivot shaft 98 is surrounded by upper arm sleeve 100. As seen in FIG. 3, the upper arm pivot shaft 98 and pivot sleeve 100 provide for a pivotable engagement for an upper arm clevis 96. Upper arm clevis 96 comes together forward of hydraulic ram 80 to begin a single arm structure 102. Upper arm turn buckle 104 provides for a locking variable adjustment in length of upper arm 102. Upper arm turn buckle 104 has a torque spoke wheel 106 which can be locked by use of spoke wheel lock pin 108 placed through pin aperture 110 disposed in the torque spoke wheel 106. Passing through the spoke wheel 106, the spoke wheel lock pin 108 engages and travels through spoke wheel pin housing 109 mounted on the junction shaft 111 of clevis 96. Torque spoke wheel 106 interacts with adjustment threads 112 to lengthen or shorten the horizontal dimension of upper arm 102. Because the other 3 bars are pivotably attached to each other, the ability to adjust the length of upper arm 102, assures that implement mounting means 60 will stay perpendicular to the ground no matter what height the hitch assembly 10 is set at to accommodate the various gauges of implements.

Upper arm 102 continues until it is pivotably connected to rear tower 114, a second bar in the four bar linkage of three point hitch assembly 10. The end of upper arm 102 can receive the horizontally disposed rear tower shaft 116. The rear tower shaft 116 is enclosed within rear tower sleeve 118. Rear tower shaft 116 and rear tower sleeve 118 define one corner of a four-sided polygon that makes up the four bar linkage. Rear tower 114 then extends down to pivotably engage both round bar 62 and sleeve 64 of the implement mounting means 60. Rear tower 114 also accommodates at its upper reaches hook engagement slot 74.

Also pivotably engaging round bar 62 and sleeve 64 are lower arms 120. These lower arms 120 are disposed on either side of rear tower 114. Both lower arms 120 run between the implement mounting means and the lifting pivot housing 92 seen in FIG. 3. The lower arm 120 on the right side of the drawing in FIG. 3 is shown being attached to lifting pivot housing 92 through the use of attachment washer 124. On the inside of the lower arm 120 as shown in the upper part of FIG. 3, is stabilizer plate 126. Two stabilizer plates 126 are on both sides of lift actuation plate 86. Stabilizer plate 126, as shown in FIG. 5 is shaped so it is partly above and partly below lift actuation plate 86. Referring now to FIG. 1, the upper side of the drawing shows lower arm 120 and the various attachments as seen in dashed lines below top locking plate 40. The lower side of FIG. 1 shows the attachments for lower arm 120 in solid line because no structure obscures viewing these parts from the top plan.

Figure 8:
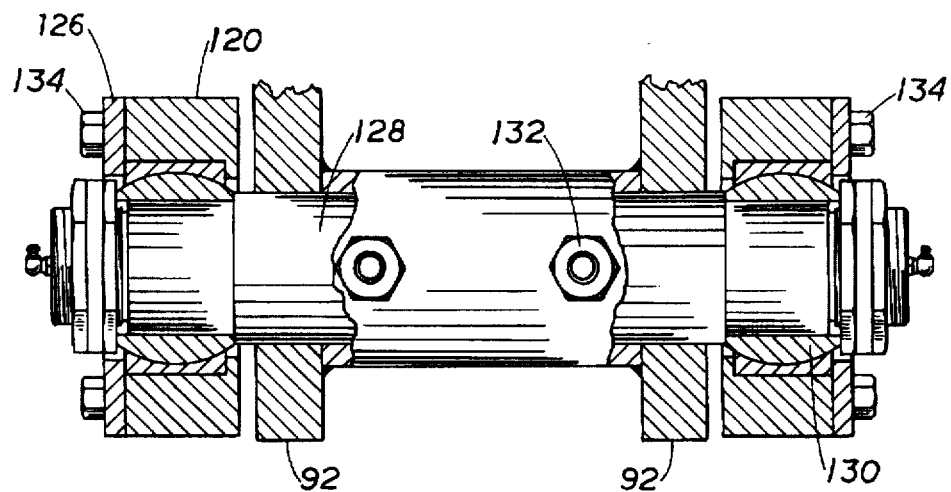
FIG. 8 is a cross-sectional view taken along lines 8—8 of FIG. 1 of the bottom pivot attached to the swivel mounting means.

FIG. 5 also shows forward round bar 128 running between the two vertical sides of lifting pivot housing 92. As shown in FIGS. 5 and 8, which is taken along view lines 8—8 in FIG. 1, forward round bar 128 provides the pivot point for the lower arms 120. The means of providing for a pivot are again plane spherical bearings designated arm spherical bearings 130. To keep forward round bar 128 in position, two horizontal shaft bolts 132 secure its engagement. These horizontal shaft bolts 132 are inboard of stabilizer plates 126, which are inboard of lower arms 120. As seen in FIG. 8, bolts 134 secure the stabilizer plate 126 to lower arm 120.

Referring again to FIG. 1, telescoping linkage 44 is shown at the bottom of the figure with view line 9—9 drawn through it. Now referring to FIG. 9, a cross-sectional view of the telescoping linkages 44, at the right side can be seen round bar 62 of implement engagement means 60. Surrounding round bar 62 is sleeve 64. Attached to sleeve 64 is triangular plate 48. Within triangular plates 48 is bottom bearing 52 held in place by bearing shaft 50. Telescoping linkage 44 attaches to bottom bearing 52 so that it can pivot and accommodate the horizontal sway of three point hitch assembly 10. At the opposite end of telescoping linkage 44, is pivotable bearing 42. This pivotable bearing 42 provides telescoping linkage 44 freedom to rotate in a plane that is normal to the plane of pivoting for the bottom bearing 52. Pivotal bearings 42 and telescoping linkages 44 follow the movement of the three point hitch 10 when it is being moved in the vertical dimension, i.e. being raised or lowered. Holding pivotal bearing 42 in place is top bearing mount 38 which is mounted on top shelf 36. By this arrangement of pivotable bearing 42 and bottom bearing 52, telescoping linkage 44 can now refrain from applying any force until 75% of the vertical travel in an upward direction of raising the three point hitch assembly is accomplished. After 75% of travel is accomplished and the telescoping linkages 44 rods have collapsed together as much as possible, the telescoping linkage 44 urges the four bars and implement engagement means 60 toward a common position.

Figure 7:
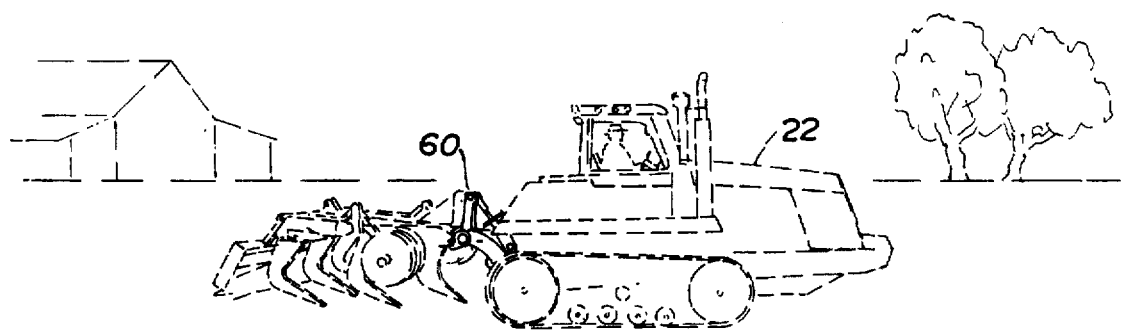
FIG. 7 is a side view of an implement attached by the hitch assembly to a endless tread land vehicle in a farm setting.

As seen in FIG. 7, the upraised position for three point hitch assembly 10 is used to carry an implement above the ground. Land vehicle 22 is seen traversing ground in a farm setting with the implement engagement means 60 in its uppermost raised position. This position would be valuable when turning the land vehicle 22 around to address another row of crops, or transporting the implement from one field to another.

Referring now to FIG. 6, the four bar linkage is in its raised position, at the end of the vertical upward travel for the hitch assembly 10. This FIG. 6 shows a partial view where many of the three point hitch assembly parts are not shown for purposes of clarity. Lifting pivot housing 92 is shown mostly covering hydraulic ram 80. As contrasted with the extension of the ram arm 82 shown in FIG. 5, in FIG. 6 arm 82 is more withdrawn into hydraulic ram 80. This causes lower arm 120 to be pivoted upwards around round bar 128 which is covered by attachment washer 124. Shown below lower arm 120 is ram plane spherical bearing 84 through which vertical forces apply to the four bar linkage. Also pivoted in an upward direction is upper arm clevis 96 which pivots around upper arm pivot shaft 98. While upper arm clevis 96 and lower arm 120 are being moved in an vertically upward direction, rear tower 114 which contains implement engagement means 60, is also being translated in a vertically upward direction. The bottom of rear tower 114 pivots simultaneously with the rearward end of lower arm 120 about round bar 62. At the top of rear tower 114 upper arm 102 pivots about the rear tower shaft 116 where it joins rear tower 114. By having all the connections between the four bars of the four bar linkage pivotable in nature, the four-sided polygon which is defined by the four bar linkage accommodates a variety of shapes as the three point hitch assembly has been raised into its topmost position. In a similar fashion, when hydraulic ram 80 extends ram arm 82 downward, to effectuate a downwardly vertical translation of the three point hitch, the pivotably connected four bar linkage allows for a variety of four-sided polygonal shapes. This ability to assume a variety of shapes for the four-sided polygonal figure as defined by the four bars of the four bar linkage, assists in assuring implement engagement means 60 remain vertically disposed when an implement is engaged in the ground and the hitch assembly 10 is position in the lower part of its vertical travel. This vertical orientation of the implement engagement means 60 is important to accommodate various gauges of three point implements. Depending upon the height above the ground of the pins which engage the top hook 68 and lower couplers 66 the instant three point hitch can assure efficient ground engagement for the implements of various gauges.

Referring now to FIG. 10, the three point hitch assembly is shown to have drifted "out of alignment" laterally with the longitudinal axis of the land vehicle 22 direction of travel. FIG. 10 should be contrasted with FIG. 1 wherein the three point hitch assembly 10 is in alignment with this longitudinal axis of travel. The contrast most to be noted is the length of telescoping linkages 44. It is to be noted that the top telescoping linkage 44 has three inner nesting arms displayed, for it to accommodate the greater length between the pivotable bearing 42 at the top forward portion of the hitch assembly and bottom bearing mount 46 rearward lower portion of the hitch assembly 10. This is to be contrasted with the lower telescoping linkage 44 which has a shorter distance of travel between these two same hitch parts because the hitch has been translated horizontally out of alignment with the direction traveled. Also, the ability of pivotal bearing 42 to attach to telescoping linkage 44 at an angle that is not perpendicular to the axis of the pivotal bearing should be noted.

Figure 2:
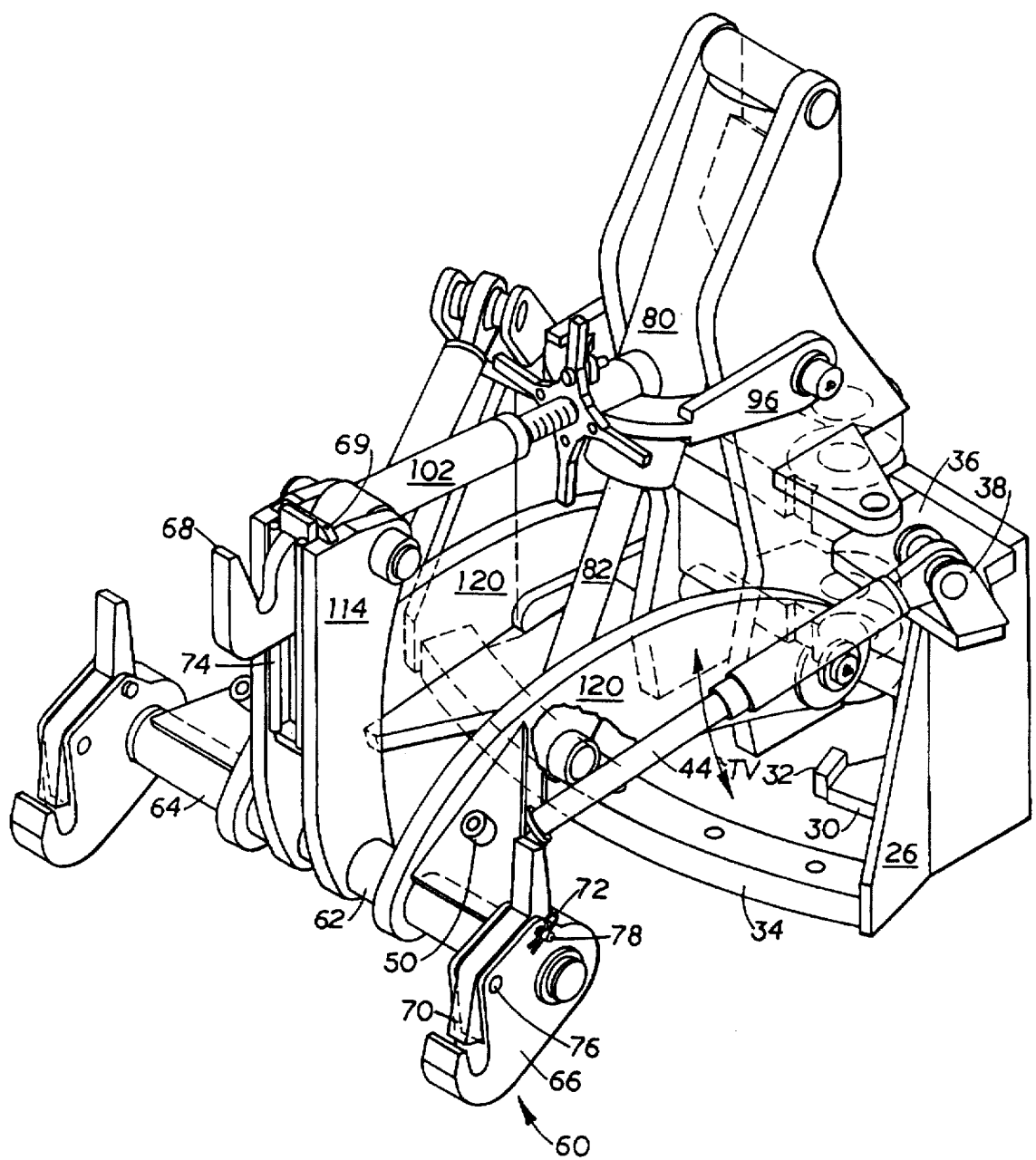
FIG. 2 is a perspective drawing of the hitch assembly as seen from the starboard corner.

Finally, FIG. 2 should be contrasted with FIG. 3 to see how the pivotal mounting means 12 and the telescoping linkages 44, not present in FIG. 3, interconnect. In particular, it should be noted that the shape of lower arms 120 is such that it can accommodate the continual presence of draw bar swivel plate 34. The curved shape of FIG. 120, at least as far as the bottom edge is concerned, not only allows the incorporation of draw bar swivel plate 34 and any draw bar when the three-point hitch assembly 10 is aligned with the direction traveled, but also when the hitch assembly 10 is translated horizontally.

Figure 4:
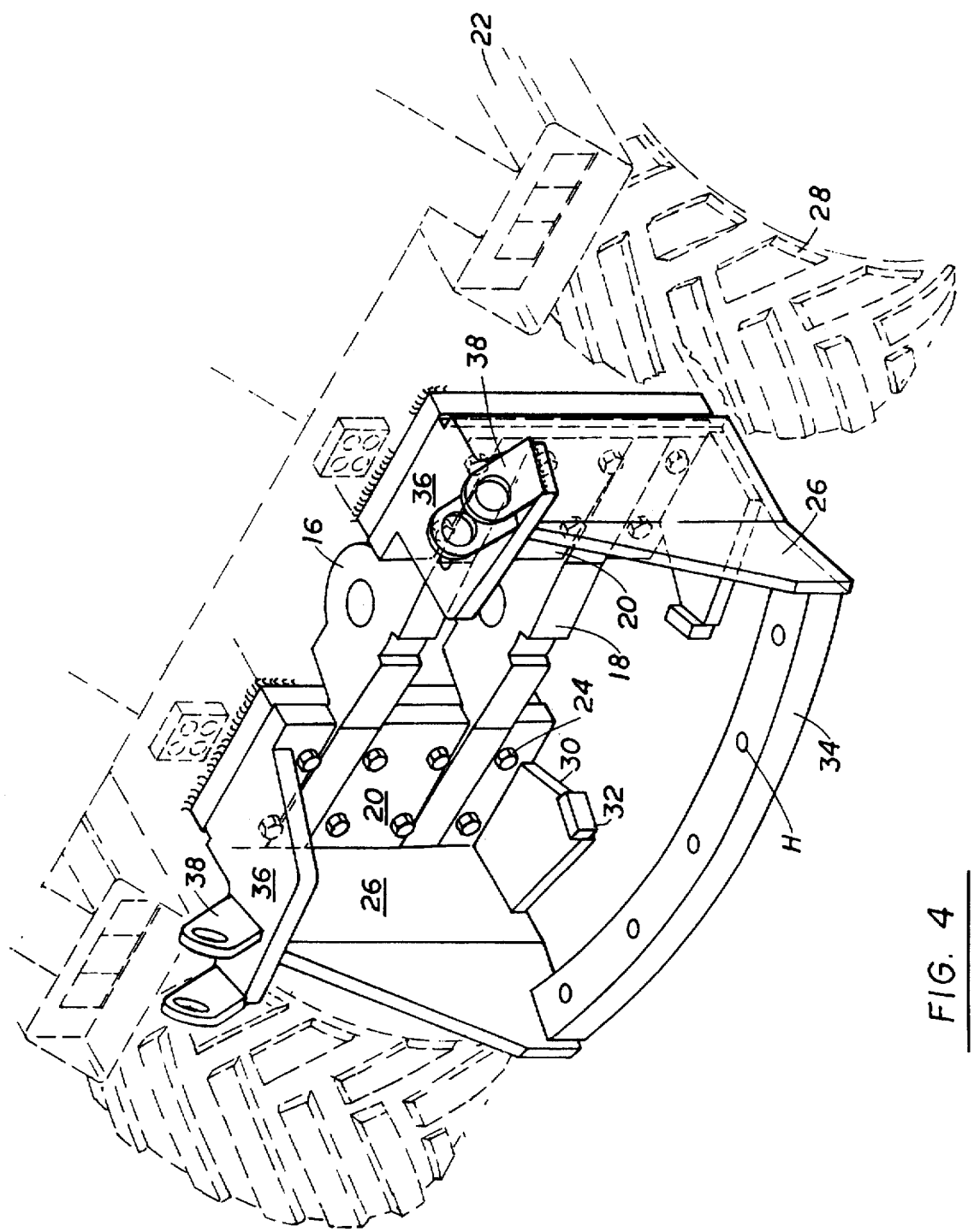
FIG. 4 is a partial section of the three point hitch assembly showing the mounting plates of the assembly attached to a land vehicle.

In use and operation, the three point implement hitch 10 is first mounted onto land vehicle 22 by tightening bolts 24 to bring mounting plates 20 into abutting relationship with the rear of the land vehicle 22 as seen in FIG. 4. Next the gauge of an implement to be mounted on the hitch 10 is observed and the length of upper arm 102 is adjusted by turning upper arm turnbuckle 104 seen in FIG. 5 to rotate adjustment threads 112. Rotation is stopped when the upper arm 102 positions rear tower 114 and implement engagement means 60 in a vertical orientation when the hitch assembly 10 is set at a height that engages the implement in the ground. Next the desired implement is attached to implement engagement means 60 by having the mounting pins of the implement positioned at the bottom of the opening in top hook 68 and lower couplers 66. One way to attach the implement is for hitch assembly's 10 hook 68 and couplers 66 be positioned below the implement mounting pins and then have the hitch assembly 10 pivot upwards in the same direction as indicated by arrow V in FIG. 5. Once the implement mounting pins are properly positioned, cotter pins 72 can secure lock pins 78 into position to lock swinging restraints 70 into position over implement mounting pins, thus preventing the implement mounting pins from leaving lower couplers 66.

Now that the implement is mounted, hydraulic ram 80 can lower the hitch assembly 10 until the implement is engaged in the ground to do its work. This may be unnecessary if the implement has its own means for moving the implement's working surfaces into engagement with the ground.

When it is desired to raise the implement, hydraulic ram 80 can withdraw ram arm 82 in an upward direction as indicated by double headed arrow HV in FIG. 5. When ram arm 82 reaches the limit of its upward travel, the hitch assembly is in the position indicated in FIG. 6. As can be seen, the four bars 92, 102, 114, and 120 of the four bar linkage 91 have defined a new shape for the four-sided polygonal figure because the bars are pivotally connected to the other bars at the corners of the four-sided polygonal figure.

Referring now to FIG. 10, during the travel of the hitch assembly 10 from the position shown in FIG. 5 to the position shown in FIG. 6, telescoping linkages 44 exert a centering force in the direction shown by arrows C in FIG. 10. After 75% of the vertical travel of the hitch assembly 10 shown by arrow V in FIG. 5 has been accomplished, and the linkages 44 have pivoted upwards as shown by arrow TV in FIG. 2, one or both of the telescoping linkages will have shortened sufficiently in the direction of arrow TL shown in FIG. 1, that further shortening is no longer possible. If the four bar linkage 91 is off center line, the telescoping linkage 44 on that side will exert a centering force to move the four bar linkage in the direction of arrow C and toward alignment with the longitudinal axis of travel. When the hitch assembly 10 is in its fully upright position, as shown in FIG. 7, the four bar linkage 91 will be held in alignment with the longitudinal axis of travel by both telescoping linkages assemblies 43.

Referring now to FIG. 1, the hitch assembly 10 is aligned with the longitudinal axis of travel. It is to be noted that the telescoping linkages 44 on both sides of the center line are the same length. This alignment can be held against forces tending to push the hitch assembly 10 out of alignment if handle 41 is in the lower position off the secondary pin and allowing primary pin 39 to engage wing plate 40. However, if the handle 41 is fitted over secondary pin and not engaged with wing plate 40, then hitch assembly 10 can be moved in a horizontal arcing direction as indicated by arrow H in FIG. 1 to go to the position shown in FIG. 10. The force inducing horizontal movement can vary from an implement encountering asymmetric drag force due to differing soil conditions to steering the land vehicle 22 in a changed direction.

Referring now to FIG. 10, it should be noted that the telescoping linkage 44 above the center line has been lengthened in the direction indicated by arrow TL in FIG. 1. On the other hand, telescoping linkage 44 below the center line in FIG. 10 has been shortened in the direction indicated by arrow TL in FIG. 1. FIG. 10 also shows how both telescoping linkages 44 have pivoted in the horizontal plane as indicated by the double headed arrow TP. When the telescoping linkage pivot the opposite way because hitch assembly 10 has moved in the opposite direction as indicated by the other head on arrow H, so the second head on arrow TP represents this opposite movement. The rods of telescoping linkages 44 can also rotate with respect to one another as indicated by arrow TR in FIG. 1. After an arc travel of approximately 15° by the hitch assembly 10 to either side as showing by arrow H in FIG. 1, lower arm 120 will come into contact with and be stopped by bump plate 32 mounted on stop 30 shown in FIG. 2.

Figure 12:
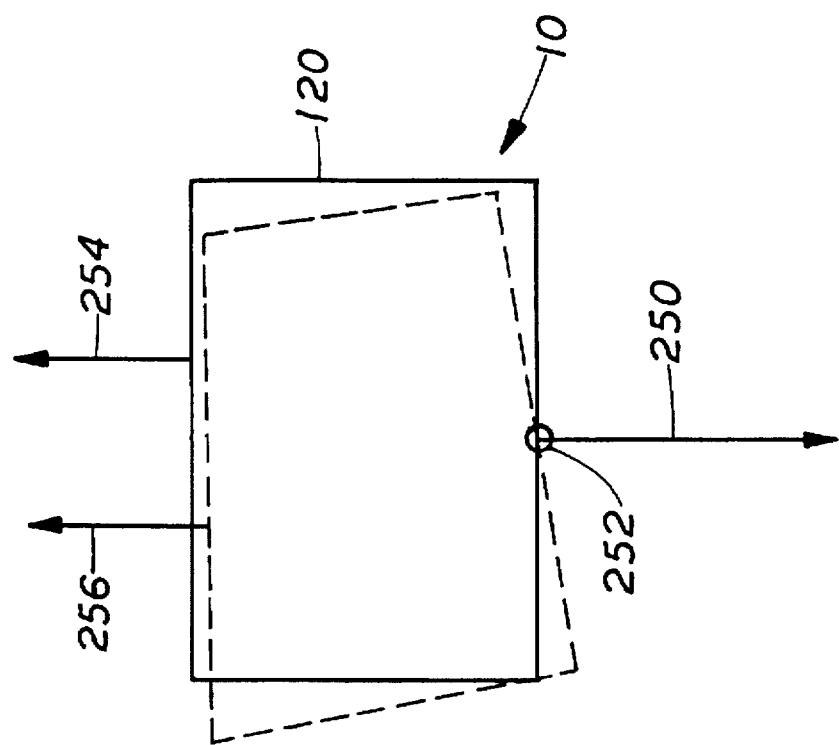
FIG. 12 is a schematic diagram of the shift in drag forces when the hitch assembly has pivoted away from the longitudinal axis of the direction of travel of the land vehicle.
Figure 11:
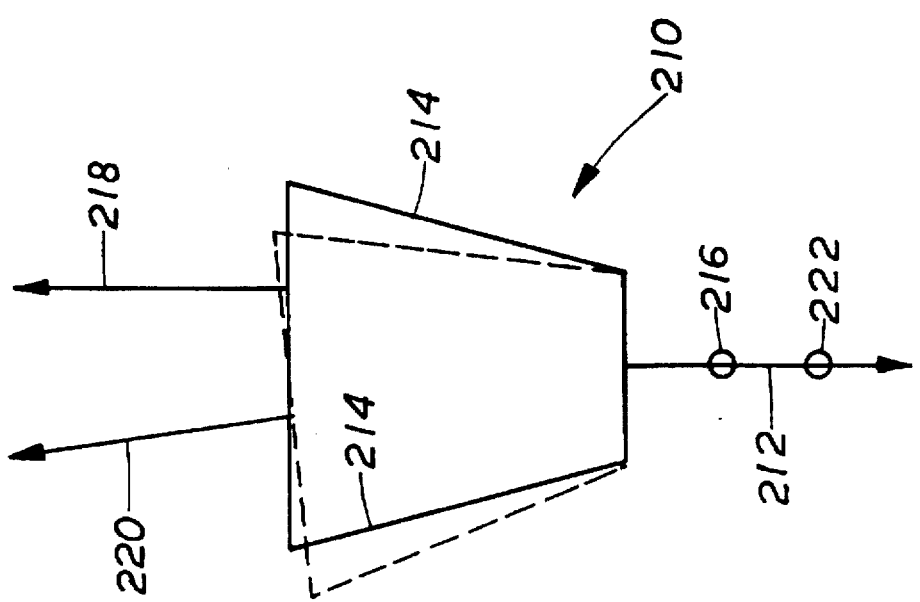
FIG. 11 is a schematic diagram of the shift in drag forces when previously known hitch 210 has pivoted away from the longitudinal axis of the direction of travel of the land vehicle.

Referring now to FIGS. 11 and 12, the difference between the handling of tractive and drag forces for one of the previously known hitches 210 in FIG. 11 and the three point hitch assembly 10 in FIG. 12 are illustrated in these schematic force diagrams. In FIG. 11, the previously known hitch 210 when it is aligned with the land vehicle's longitudinal axis of travel, which is also the force vector line 212 for the forward tractive force exerted through the hitch to the implement, is shown in solid outline. The reference hitch's 210 draft links 214 are shown as being at oblique angles to the portion of the land vehicle with its pivot point 216 being forward of the rear of the land vehicle. The implement's drag force vector 218 is parallel to the tractive force vector 212. However, when the previously known hitch 210 undergoes a horizontal arcing movement to the left by an arbitrarily selected 10° (for illustration purposes), the shifted tractive force vector 220 represents the implement's pulling force on the hitch. The forces acting through the hitch, because the draft links 214 are not parallel, now act as though the hitch 210 had the shape shown in broken lines. The effect of forces assuming such an arrangement is to shift the pivot point representing the convergence of drag forces to a phantom pivot point 222. The shift of the phantom pivot point 222 (which is even further forward than pivot point 216) when the hitch moves horizontally results in only a reduced percentage of the tractive force shown by vector 212 being applied to the implement. This reduction in force causes a waste of energy and increased wear on the previously known hitch 210.

Now referring to FIG. 12, the three point hitch assembly 10 shown in solid outline has tractive force 250 from the land vehicle 22 being applied through pivot point 252 when the hitch assembly 10 is aligned with the longitudinal axis of travel. An implement mounted on the hitch 10 also exerts a drag force represented by vector 254. When the hitch assembly 10 is moved to the left an arbitrary 10° in a horizontal arcing path, the forces translated through the hitch assembly 10 act as though the hitch 10 has the shape shown in the broken lines. The new drag vector 256 remains parallel to original drag vector 254. It is to be noted also that the lower arms 120 stay parallel to each other and, as a result, the pivot point 252 also serves as the pivot point for the hitch in the off-longitudinal-axis position. Because the pivot point remains at pivot point 252, the full tractive force represented by vector 250 is applied to the implement in its new horizontally shifted orientation, resulting in the saving of energy and reduced wear on the machinery parts.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A hitch assembly, comprising:
    a pivotal mounting means providing for horizontal movement of said hitch assembly;
    an implement engagement means;
    a means for providing for vertical movement of said implement engagement means between a raised position and a ground engagement position, said vertical movement means connecting said implement engagement means and said pivotal mounting means;
    a means for adjusting the angle of attack of said implement engagement means so that said implement engaging means is oriented vertically;
    a means for tolerating and controlling horizontal movement of said implement engagement means; and
    a means for centrally positioning said implement engagement means at one central point in relation to the pivotal mounting means when said hitch assembly is raised to about 75% of its maximum height.

2. The hitch assembly of claim 1 further comprising a means to lock said implement engagement means at one centered location at maximum height.

3. The hitch assembly of claim 1 wherein said means for providing vertical movement comprises four elongated members arrayed to form a four-sided polygonal structure, said members pivotally connected at respective four corners defined by intersecting ends of any two said elongated members, and a drive means.

4. The hitch assembly of claim 3 wherein said four elongated members connected to define a four bar linkage having a lower member, an upper member spaced therefrom, said lower and upper members connected by a rear tower member and a pivot housing at ends thereof.

5. The hitch assembly of claim 4 wherein said drive means is a hydraulic ram pivotally connected from a ram support to said lower member of said polygonal structure.

6. The hitch assembly of claim 5 wherein said means for providing for vertical movement includes a means to vary the length of said upper member of said polygonal structure.

7. The hitch assembly of claim 4 wherein said means for tolerating and controlling horizontal movement includes two oppositely disposed stops to limit the range of horizontal motion of said lower member.

8. The hitch assembly of claim 1 wherein said means for centrally positioning said implement engagement means at maximum height includes two oppositely disposed telescoping arms mounted in pivots at each end, said arms each connecting to pivotal mounting means and to said implement engagement means.

9. The hitch assembly of claim 8 wherein said telescoping arms urge said implement engagement means to the one central point only after said implement engaging means has vertically and arcuately traveled up through about 75% of its range of motion.

10. The hitch assembly of claim 1 wherein said implement engagement means includes adjustment means to receive implements fitting one of a number of standard three-point hitch attachments.

11. The hitch assembly of claim 1 wherein a lower member of said hitch assembly has an arcuate shape with a radius of curvature below said lower member to permit clearance for a draw bar hitch oriented below said lower member when said hitch assembly has no other implements engaged.

12. A method for controlling implement position in relationship to a land vehicle, comprising:
    providing a hitch assembly for mounting an implement onto the land vehicle comprising,
    a pivotal mounting means for providing horizontal arcuate movement of said hitch assembly;
    an implement engagement means;
    providing a means for vertical arcuate movement of said implement engagement means between a raised position and a ground engagement position, said vertical arcuate movement means connecting said implement engagement means and said pivotal mounting means;
    providing a means for adjusting an angle of attack of said implement engagement means in relation to a vertical axis of a rear tower member which supports the implement;
    providing a means for tolerating and controlling horizontal movement of said implement engagement means;
    providing a means for positioning said implement engagement means at some point in relation to the pivotal mounting means when said hitch assembly is at its maximum height;
    engaging the implement with a three-point hitch by adjusting one point of the hitch and fastening to the implement;
    lowering said hitch assembly so that said implement engages the ground;

driving said land vehicle across the ground and controlling said implement to limit horizontal arcuate movement about a longitudinal axis of travel which is parallel to direction of travel;

raising said hitch assembly to disengage said implement from the ground and centering to a preselected position at about 75% of a highest hitch assembly setting, and locking the implement in a raised position for travel.

13. The method of claim 12 wherein said step of providing a means for providing vertical movement of said implement engagement means comprises providing four elongated members arrayed to form a four-sided polygonal structure, said members pivotally connected at ends thereof, and providing a hydraulic ram pivotally connected from a ram support and to a lower member of said polygonal structure.

14. The method of claim 12 wherein said step of providing a means to position and center said implement engagement means at maximum height includes providing two oppositely disposed telescoping arms mounted with pivots at each end, said arms each connecting to pivotal mounting means and to implement engagement means.

15. The method of claim 12 wherein said step of providing a means for providing for vertical arcuate movement includes providing a means to vary the length of an upper member of said polygonal structure.

16. A hitch assembly attached to a land vehicle equipped with endless treads, for use in mounting implements behind said land vehicle, said assembly being movable between a raised position and a lowered operating position, said hitch assembly comprising:

swivel mounting means for mounting said hitch assembly to said land vehicle and for providing arcuate horizontal swivel about a vertical axis;

positioning means for moving said hitch assembly from said raised position to said lowered operating position, said positioning means comprising a four bar linkage formed by connecting arms, and a drive means, said arms connected pivotally to each other at corners of a four-sided polygon formed by at least two horizontal arms and at least two vertical arms, whereby one horizontal side of the polygon has means to adjust its length and be locked at a desired length, and two of said corners are held at fixed positions on said swivel mounting means, and two of said corners are held at fixed positions on implement engagement means;

stop means to limit horizontal arcuate swivel of said four bar linkage about a vertical axis mounted on an inboard surface of said swivel mounting means;

implement engagement means attached to a rearward portion of said at least two vertical arms;

a telescoping rod positioning assembly pivotally mounted between said swivel mounting means and said implement engagement means to return said hitch assembly to one central point when said hitch assembly is fully raised;

wherein said telescoping rod positioning assembly urges said implement engagement means to one point only until said implement engagement means has vertically and arcuately traveled up through about 75% of its vertical range of motion.

17. The hitch assembly of claim 16 wherein said at least one horizontal arms, when lowered, have clearance to allow use of a draw bar hitch on said land vehicle when no implement is engaged to said hitch assembly.

18. The hitch assembly of claim 16 wherein said implement engagement means includes means to receive implements fitting one of a number of standard three-point hitch attachments.

19. The hitch assembly of claim 16 wherein said stop means includes two oppositely disposed stops to limit the range of horizontal motion of said connecting arms.

20. A three-point hitch assembly for enhancing steering correction on a tractor driven by a pair of endless tracks located on sides of the tractor, the improvement comprising:

a vertically oriented swivel shaft having a vertical longitudinal axis mounted at a rear of the tractor and having means to allow rotational movement of said shaft about its vertical longitudinal axis, a four bar linkage coupled to said shaft and free to move about said shaft's vertical longitudinal axis, an implement engaging means coupled to said four bar linkage and free to move about said shaft's vertical longitudinal axis through said four bar linkage, means to move said four bar linkage such that said implement engaging means moves from a ground engaging deployed position to an elevated, retracted position, means to limit movement of said four bar linkage in an arc about said shaft's vertical longitudinal axis, means for returning said four bar linkage to a central position, aligned with a longitudinal axis of the tractor when said implement engaging means is in an elevated, retracted position, said four bar linkage is configured as a four sided polygon having a first arm substantially parallel to said shaft and pivotably connected thereto for movement thereabout, a second arm substantially parallel to said first arm and spaced therefrom and supported thereto by a pair of vertically spaced, parallel, horizontally oriented third and fourth arms which are connected to said first and second arms, thereby defining said four bar linkage, a ram extends between said fourth arm and said first arm to provide said moving means for said four bar linkage, said implement engaging means is coupled to said second arm, and wherein said fourth arm has clearance on a lowermost side thereof to accommodate a draw hitch bar thereunder, said draw hitch bar coupled to said tractor.

21. The three-point hitch assembly of claim 20 including a stop mechanism on opposite sides of said four bar linkage to limit four bar linkage arcuate motion about said shaft, defining said limit movement means.

22. The three-point hitch assembly of claim 21 wherein said returning means includes two telescoping arms each having an end extending from a rear of the tractor equispaced from and outboard said shaft and terminating on said implement engaging means such that when said four bar linkage is centered with respect to a long axis of the tractor, said telescoping arms converge towards said implement engaging means, whereby when said four bar linkage is raised to the elevated, retracted position, said telescoping arms contract and center said ground engaging implement.

23. The three-point hitch assembly of claim 22 wherein said telescoping arms contract when said hitch assembly is raised to about 75% of its maximum height.

24. The three-point hitch assembly of claim 23 wherein said implement engaging means couples to said second arm by a three-point hitch support with one said hitch support having adjustment means to accommodate different classes of three-point hitches.

* * * * *